United States Patent [19]
Mallory

[11] 3,833,444
[45] Sept. 3, 1974

[54] TIRE BUILDING APPARATUS OF BUILDING TIRES
[75] Inventor: Edwin E. Mallory, Niles, Mich.
[73] Assignee: National Standard Company, Niles, Mich.
[22] Filed: Jan. 19, 1972
[21] Appl. No.: 219,001

[52] U.S. Cl. .............................. 156/400, 156/417
[51] Int. Cl. ... B29h 17/16, B29h 17/18, B29h 17/26
[58] Field of Search ........... 156/398, 400, 401, 132, 156/135, 123, 414, 415, 417, 419, 110

[56] References Cited
UNITED STATES PATENTS

| | | | |
|---|---|---|---|
| 3,560,301 | 2/1971 | Cantarutti | 156/401 |
| 3,560,302 | 2/1971 | Missioux | 156/415 |
| 3,562,062 | 2/1971 | Bryant | 156/401 |
| 3,607,558 | 9/1971 | Nebout | 156/417 |
| 3,616,059 | 10/1971 | Frazier | 156/417 |
| 3,647,598 | 3/1972 | Gazuit | 156/415 |
| 3,674,604 | 7/1972 | Gazuit | 156/415 |
| 3,684,621 | 8/1972 | Frazier et al. | 156/401 |
| 3,698,987 | 10/1972 | Woodhall et al. | 156/401 |

*Primary Examiner*—Clifton B. Cosby
*Attorney, Agent, or Firm*—Johnson, Dienner, Emrich, Verbeck & Wagner

[57] ABSTRACT

A tire building apparatus having an expandable drum defined by a plurality of circumferentially arranged deck segments each comprising a plurality of peripherally extending support members movable radially and circumferentially relative to each other to provide supporting surfaces of different radii with adjacent outer end portions of adjacent supporting members being interleaved, and in which the outer end portions of the supporting members are of less cross-sectional area than the cross-sectional area of intermediate portions of the supporting members to provide supporting members of increased length over prior known construction and to provide in the expanded position of the expandable drum a circumferentially extending supporting surface of a maximum length substantially equal to the circumferential length of the interleaved outer end portions of the supporting members and intermediate portions of the supporting members. The expandable drum, as aforenoted, in which the deck segments comprise deck former members for supporting individual supporting members, in which the deck former members have positioning surfaces for engaging radial inward surfaces of the supporting members for disposing the latter in predetermined positions upon expansion and contraction of the expandable drum, and in which the supporting members may or may not be provided with outer end portions of the supporting members as first above described.

A tire building method in which tire beads are disposed inwardly of opposite outer end portions of elongated hollow tire carcass material, displacing the center portion of the tire carcass material to form the same into the true shape of the crown portion of the carcass of a cured tire, and encasing tire beads in the outer end portions of the tire carcass material.

11 Claims, 27 Drawing Figures

TIRE BUILDING APPARATUS OF BUILDING TIRES

BACKGROUND OF THE INVENTION

It is known prior to the present invention to provide tire building apparatus comprising an intermediate expandable drum and end drum assemblies which in starting or initial positions thereof provide a substantially cylindrical surface for supporting tire carcass material in the form of a cylinder thereon. The intermediate drum may, for example, be of a construction embodying a plurality of circumferentially arranged deck segments each of which includes a plurality of supporting members extending in directions circumferentially of the drum, and which are in end-to-end interleaved relation between adjacent deck segments so that upon the outward radial displacement of the deck segments, the outer surfaces of the supporting members define supporting surfaces of different radii or peripheral extent. Thus, after disposition of tire carcass material around the intermediate drum and with the end assemblies in their initial positions, the intermediate drum may be expanded to form the tire carcass material into substantially truncated torroidal configuration for the application, for example, of breaker and tread components to the crown portion of the tire carcass. Alternatively, as is also known, breaker and tread components may be supported outwardly of the intermediate drum assembly so that upon radial expansion of the intermediate drum assembly the tire carcass material therearound is expanded and pressed against the breaker and tread components so supported. The supporting members or blades of the deck segments in the positions last noted provide a firm surface of desired peripheral extent supporting the tire carcass material enabling components such as breakers and tread components to be well stitched to the tire carcass.

Also it is known in a general way to associate inflatable ply turn-up bag means and pusher means therefor to apply tire sidewall components to the sidewall portions of the formed tire carcass material.

It is further known to provide tire bead supporting and locking means at the inner ends of the end drum assemblies which, in operative position, lock, in axially spaced spart relation and concentrically of the longitudinal axis of the apparatus, the outer ends of the tire carcass material together with the tire beads thereat.

In addition it is known to introduce fluid under pressure internally of the apparatus to provide a reaction force for the application of the sidewall components to the sides of the tire carcass material by the inflatable ply turn-up bag means and pusher means when the tire carcass material has been formed into substantially torus configuration.

THE INVENTION

The invention comprehends a tire building apparatus having an expandable drum of the general character aforenoted, but in which the supporting members of the deck segments have interleaved outer end portions of less cross-sectional area than the cross-sectional area of the intermediate portions of the supporting members which, in the expanded position of the expandable drum, the overlapping outer end portions of the supporting members serve to provide a circumferentially extending surface of greater length than the supporting members of previously known expandable drums so as to form a crown portion in the tire carcass material conforming to the circumferential extent and/or radial extent of the crown portion of the carcass of a cured tire. The invention further comprehends an expandable drum in which the deck segments are defined by deck former members for supporting a plurality of individual supporting members in which the deck former members have positioning surfaces for the several supporting members for disposing the latter in predetermined positions upon expansion and contraction of the expandable drum, and in which the outer end portions of the supporting members may or may not be of reduced cross-sectional area as aforedescribed.

An expandable drum assembly as last described in which the supporting members at opposite ends of the deck segments have flat abutting surfaces slidingly engaging with each other to prevent axial distortion of the drum.

The invention further comprehends the method of building a pneumatic tire in which the tire beads are disposed inwardly of opposite end portions of tire carcass material of elongated hollow configuration, then progressively radially displacing the center portion of the tire carcass material to form the same into the shape of the crown portion of the tire carcass of a cured tire, and in which the tire beads are encased in the outer end portions of the tire carcass material. As is known, other tire components such as breakers, treads and sidewalls may be applied to the formed tire carcass material in known manner.

DESCRIPTION OF ONE EMBODIMENT OF THE INVENTION

Figure 1A:
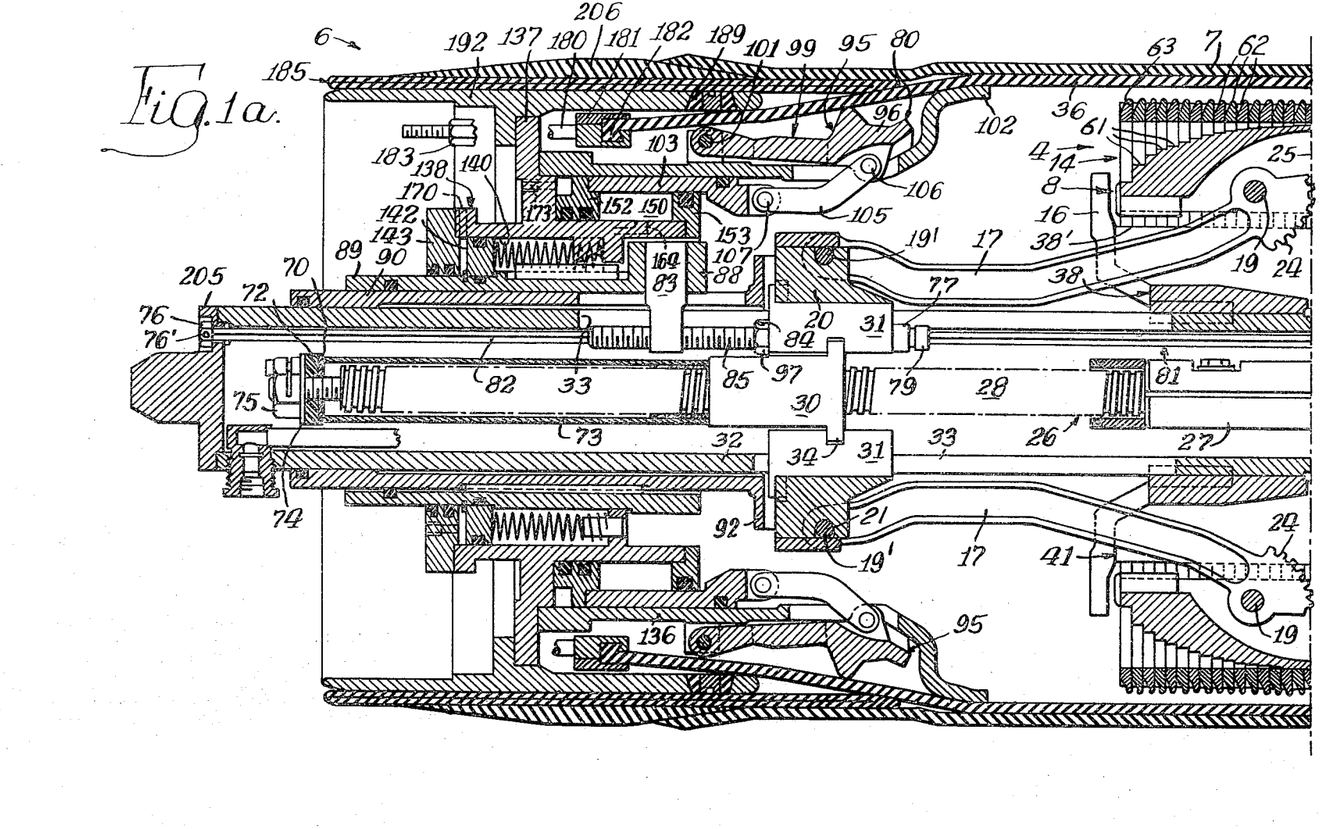
FIGS. 1a and 1b, joined in end-to-end relation on the dotted centerline, show a longitudinal sectional view of a tire building apparatus according to the present invention with the parts in position for supporting elongated hollow tire carcass material for a radial type tire construction.
Figure 1B:
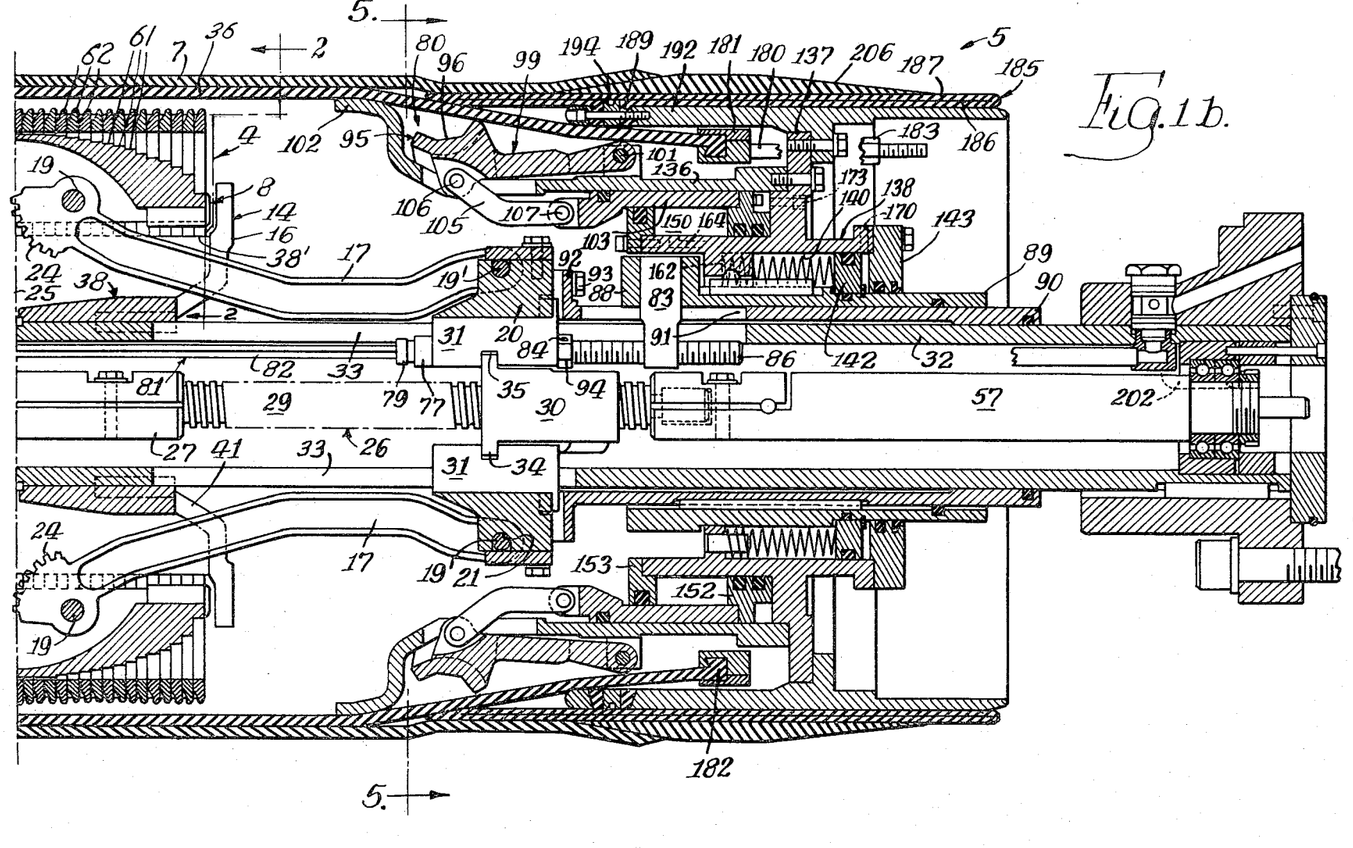

Referring now to FIGS. 1a and 1b of the drawings the tire building apparatus there shown is in many respects like that shown in the application of Edwin E. Mallory, the present inventor, and Emerson C. Bryant Case 1, Serial No. 173,769, filed Aug. 23, 1971, assigned to the assignee of this application and to which reference may be had, with the significant differences of the present application over the above noted application being in the intermediate expandable drum assembly 4 and the bead supporting and locking means indicated generally at 80. The tire building apparatus, as shown, has disposed at opposite ends thereof inboard and outboard drum assemblies 5 and 6 respectively.

Figure 5:
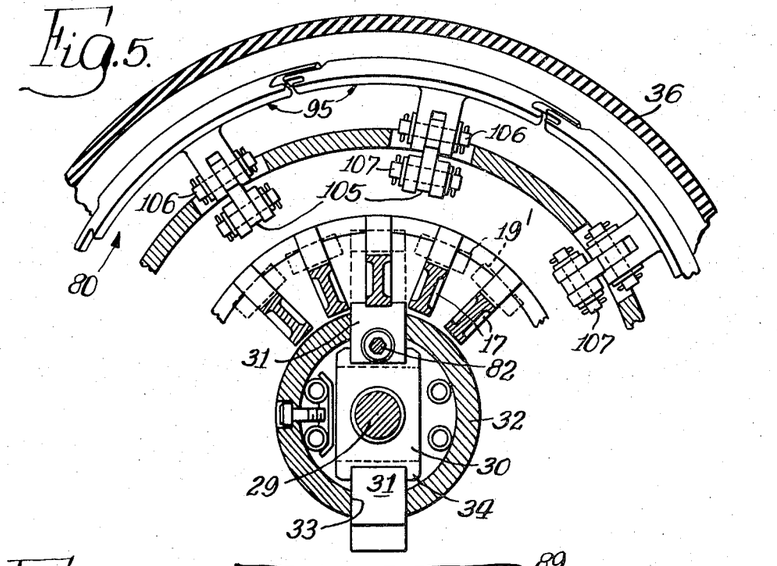
FIG. 5 is a vertical sectional view taken substantially along the line 5—5 of FIG. 1b looking in the direction indicated by the arrows.

The drum assembly 4 comprises a plurality of circumferentially arranged platforms or deck segments 8 which will be subsequently described in detail. However, as shown in FIGS. 1a and 1b, each deck segment 8 is formed with a bifurcated bracket 14 having radially outwardly extending slotted opposed arm portions 16 between which the inner ends of pusher arms 17 extend and are pivotally mounted, as at 19, to the deck segments 8. The pusher arms lie in planes extending axially of the expandable drum assembly 4, and at their outer ends are pivotally mounted as at 19' in axially spaced apart pusher means, such as pusher rings 20. As shown, the pusher rings are formed with transversely extending substantially annular sockets 21 receiving the pivot pins 19'. The pusher arms 17 adjacent their inner ends are provided with identical meshing gear teeth 24 on the transverse centerline 25 of the expandable drum assembly 4 perpendicular to the axis of the pusher rings 20. The foregoing bracket 14, pusher arms 17, pusher rings 20 and associated components, together with a hollow outer shaft 32, in which inner shaft means 26 is arranged, define, in part, intermediate drum expanding and contracting means. In the intermediate drum expanding and contracting means shown in the drawings the inner shaft means 26 is formed with left and right hand threaded shaft sections 28 and 29 respectively, joined by collar 27 at their opposed inner ends for keying the two shafts together for conjoint rotation. Ball nuts 30 have threaded engagement with the threaded portion of each of the shafts 28 and 29, each of which carries diametrically opposed ball nut adapters 31 which extend through axially extending slots 33 disposed in diametrically opposed relation in the hollow shaft 32 with one such slot being provided for each of the ball nut adapters 31. The ball nut adapters 31 have the pusher ring means 20 secured thereto by end members 34 having, as seen in FIG. 1a, 1b and 5, cut-outs 35 within which the ends of the ball nut adapters 31 are received. The centrally mounted bifurcated bracket on the hollow shaft 32 comprises guide block means 38 and the aforementioned opposed arm portions 16 at opposite ends of the hub of the guide block slotted as at 41 which serve to guide or prevent circumferential movement of the adjacent outer end portions of the pusher arms 17 during operation of the apparatus and add rigidity to the drum construction in a circumferential direction.

As before indicated FIGS. 1a and 1b show the position of the parts in the initial or starting position for forming elongated hollow tire carcass material 7 mounted on an elastic drum sleeve 36 extending between the inner ends of drum assemblies 5 and 6 to the shape of the crown portion of the tire carcass material in the expanded position of the intermediate drum assembly into a configuration conforming, if desired, exactly to that of a carcass of a cured tire. In the initial position of the parts, the inner screw means 26 has been suitably rotated by drive means including, in part, drive shaft means 57, as best seen in FIG. 1b to dispose the pusher rings 20 to their axially outermost positions with respect to each other.

After placement of the tire carcass material in position, as noted in connection with FIGS. 1a and 1b, the tire drum expanding and contracting means comprising in part the inner shaft means 26 which is rotated to effect conjoint axial inward movement of the pusher rings 20 toward each other and at the same rate in which the meshing engagement gear teeth 24 expand the intermediate drum assembly to positions as will be described for progressively forming the intermediate portion of tire carcass material on the drum sleeve 36 to a configuration in which the center portion of the tire carcass material is shaped, if desired, to conform exactly to that of the center portion of the tire carcass material of a cured tire as will be further described in detail.

The mesh of gear teeth 24, in the position of the parts as shown in FIGS. 1a and 1b, rigidly and accurately dispose the deck segments with respect to each other so that they remain symmetrical about the longitudinal axis of the drum for the carcass material. As will be subsequently described, with the intermediate drum assembly 4 expanded to its outermost position, sidewalls in the manner to be described may be placed on opposite sides of the expanded tire carcass material. It will be noted that in the intermediate drum assembly 4 the gear teeth 24 are constantly in mesh, and as the deck segments are consequently forced an equal distance radially outwardly on the axis 25 perpendicular to the axis of the pusher means 20, whereby the deck segments remain substantially equidistant to the axis of the intermediate expandable drum 4. The gear teeth are so developed as to maintain the deck segments 8 in equidistant position serving to resist unequal roller pressures and also side pressures, such as are present in the application of a breaker, tread cap and/or sidewall components as may occur in conventional stitching operations.

Also in the intermediate drum assembly shown in the drawings, the guide slots 41 in the bifurcated bracket of guide block means 38 and arms 16 serve as torsion guiding members for the pusher arms 17 and through them for the deck segments when it is desired to effect rotation of the intermediate drum assembly as, for example, in the stitching of a breaker or tread cap to the outer center periphery of the tire carcass material 7.

Figures 9, 9A, 9B, 19, 20:
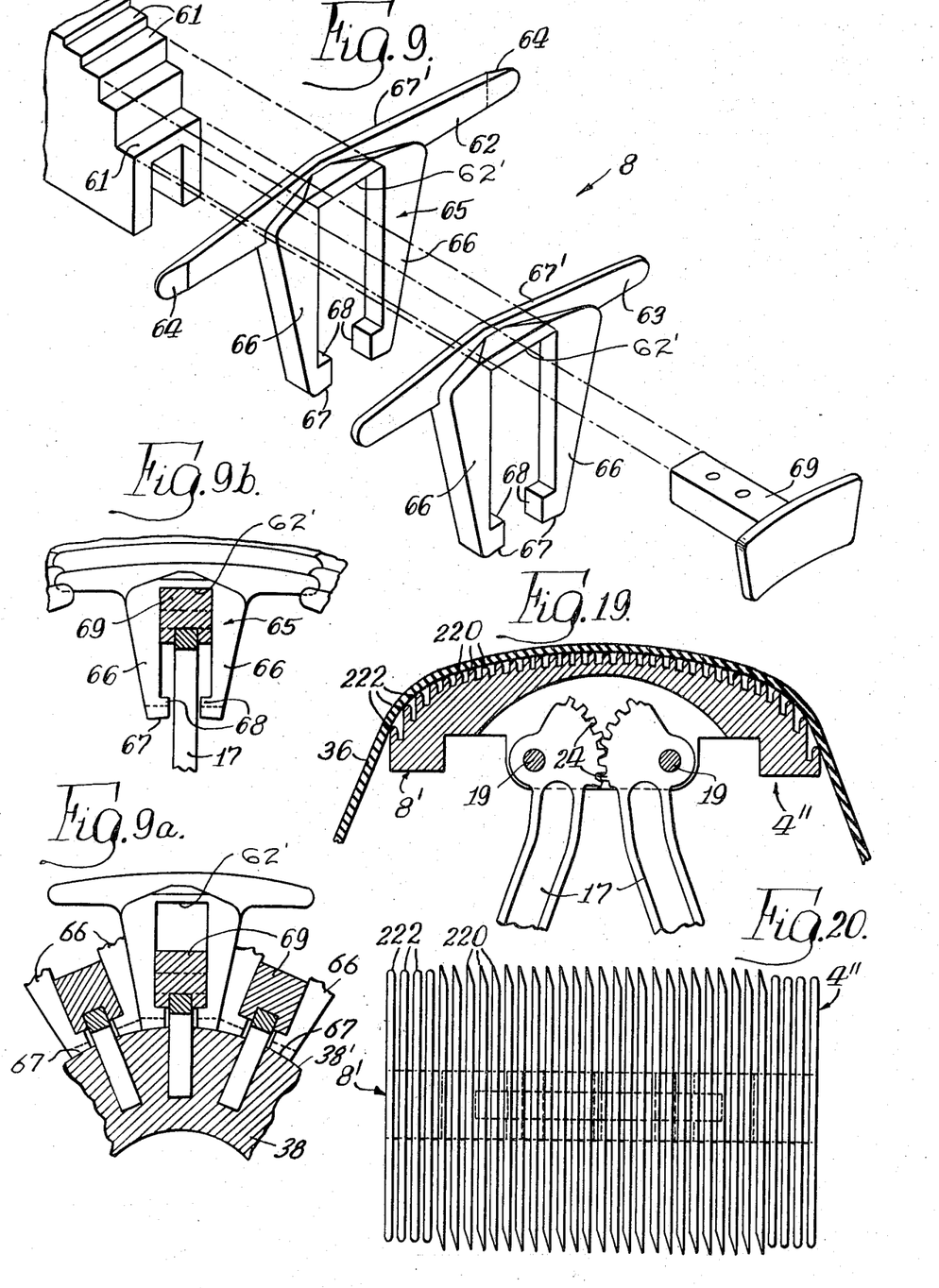
FIG. 9 is an exploded perspective view showing how typical outer and intermediate supporting members are assembled on a former block of a deck segment.
FIG. 9a is a detail view showing a supporting member of the intermediate drum assembly of FIGS. 1a and 1b in collapsed position.
FIG. 9b is a detail view showing a supporting member of the intermediate drum assembly of FIGS. 1a and 1b in its outer position.
FIG. 19 is a longitudinal cross-sectional view of a modified form of deck segment according to the present invention.
FIG. 20 is a plan view of the deck segment of FIG. 19.

The intermediate drum 4 comprises guide block means 38, circumferentially arranged deck segments 8, intermediate supporting members 62, and end supporting members 63. As best seen in FIG. 9 supporting members 62 and 63 have intermediate body portions as at 67'. Also, it will be seen that the intermediate supporting members 62 have tapered outer end portions 64 of less cross-sectional area than the cross-sectional area of the intermediate body portions 67'.

Figure 7:
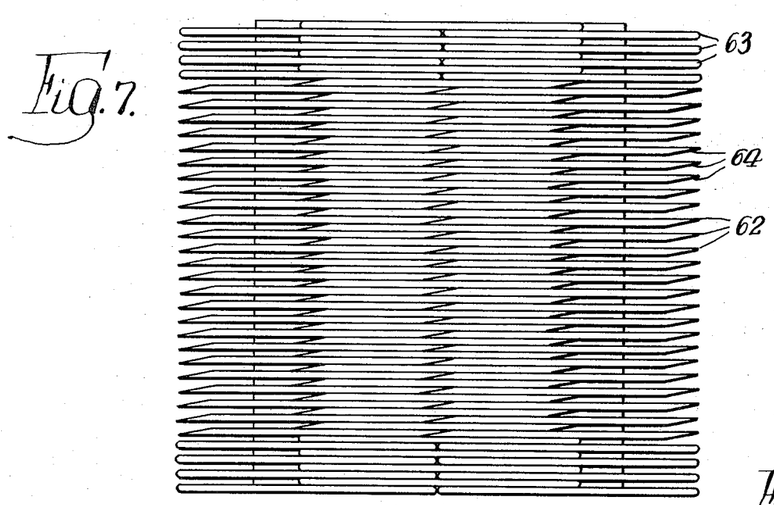
FIG. 7 is a plan view of the supporting members of the intermediate drum of FIGS. 1a and 1b showing the relationship of circumferentially adjacent deck segments in collapsed position.
Figures 7A, 8, 8A:
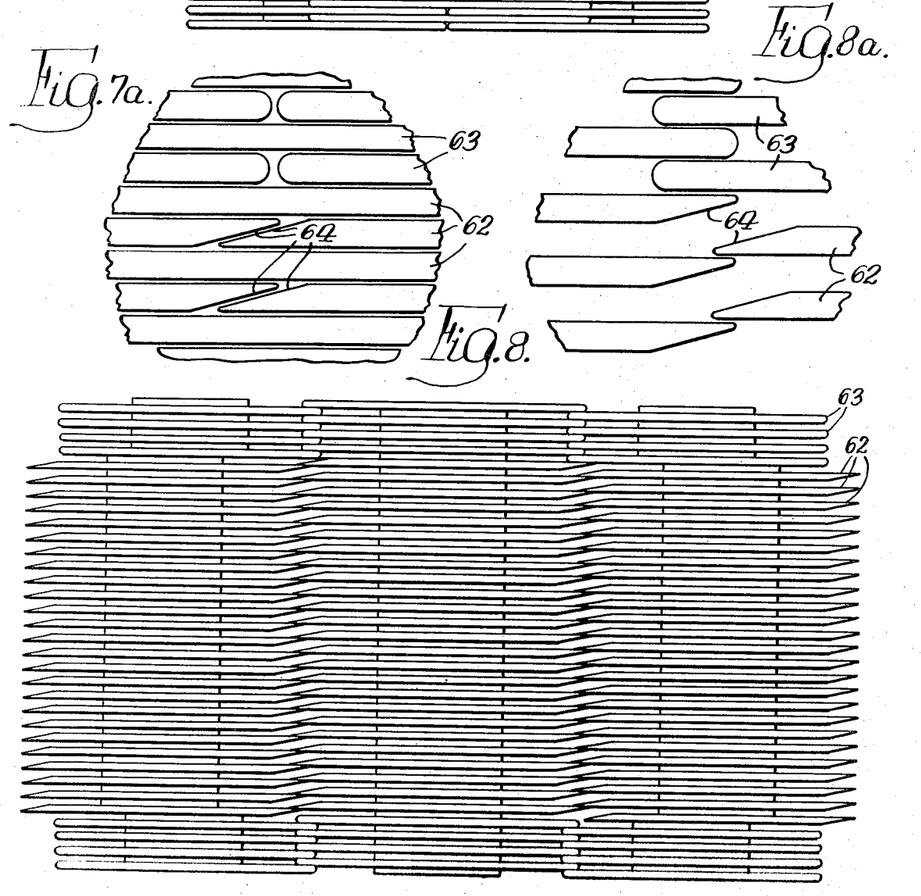
FIG. 7a is a detailed enlarged view of a portion of FIG. 7.
FIG. 8 is a plan view of the supporting members of the deck segments showing the relationship of adjoining segments in the expanded position of the drum.
FIG. 8a is a detailed enlarged view of a portion of FIG. 8.

In the collapsed position of intermediate drum 4, as best shown in FIGS. 7 and 7a, the tapered outer end portions 64 of intermediate supporting members 62 interleave with tapered outer end portions 64 of once circumferentially removed intermediate supporting member 62. In the expanded position of intermediate drum 4, as best shown in FIG. 8 and FIG. 8a, intermediate body portions 67' of end supporting members 63, interleave with intermediate body portions 67' of adjacent end supporting members 63, and the tapered end portions 64 of intermediate supporting members 62 interleave with tapered end portions 64 of adjacent intermediate supporting members 62.

As best seen in FIG. 9 each of the aforementioned supporting members of the deck segments 8 includes a body portion 65 of inverted U-shape configuration. The supporting members 62 and 63 are of generally T-shaped configuration as viewed in side elevation having opposed spaced apart arms 66 extending radially inwardly centrally of the opposite ends of the circumferentially curved supporting intermediate body portions 67' of the supporting members 62 and 63. The arms 66, having inwardly extending end flanges 68 the inner surfaces of which in the collapsed position of the drum assembly 4 and as shown in FIG. 9a engage with outer surface portions 38' of guide block 38 serving to dispose the several supporting members in positions defining a substantially cylindrical surface. Upon expansion of the drum 4, surface 62' of the supporting members engage surfaces 61 of deck segments 8 and assume the positions shown in FIG. 4 and, so as to shape the tire carcass material, as aforementioned, into a crown portion conforming to that of the crown of the carcass of a cured tire. As noted the components, as aforedescribed, in the collapsed position of the intermediate drum provide an initial supporting surface of minimum cylindrical diameter radially inwardly of the elastic drum sleeve 36. The several supporting members 62 and 63 are maintained in axially assembled position in the body portion 65 by suitable end anchor members 69.

Figures 2, 3, 4:
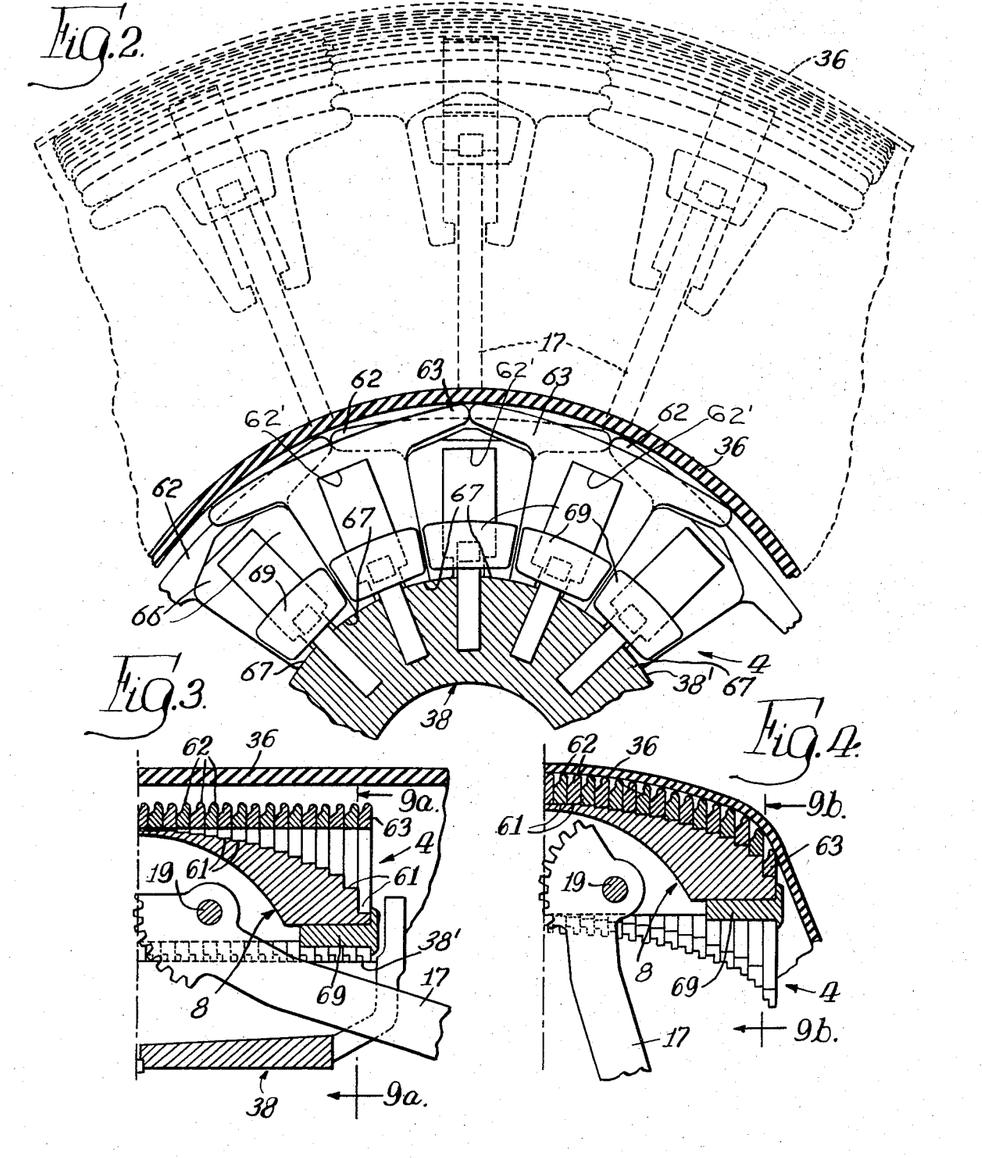
FIG. 2 is a vertical axial view taken substantially along the line 2—2 of FIG. 1b looking in the direction indicated by the arrows with certain parts being omitted for purposes of clarity, and showing in full lines an intermediate expandable drum assembly in collapsed position and in dotted lines the intermediate expandable drum in expanded position.
FIG. 3 is a partial sectional view of a portion of the intermediate drum of the tire building apparatus with the parts in collapsed position, as shown in FIG. 2.
FIG. 4 is a partial sectional view of a portion of the intermediate drum showing the drum in expanded position in the dotted line position of FIG. 2.

The inner portion of FIG. 2 shows in full lines the intermediate drum assembly in collapsed position to which it is returned after completion of the assembly of the components of a tire with the geometry being such that the intermediate drum assembly 4 and components at the inner ends of the assemblies 5 and 6, collapse together with the elastic sleeve 36 to enable removal of the completed assembly of tire components from the outboard end of the drum upon completion and retraction of the parts at the inner ends of the drum assemblies 5 and 6 to the positions shown in FIGS. 1a and 1b.

Referring again to FIGS. 1a and 1b the outboard assembly 6 comprises a resilient stop means defined by a hollow sleeve 73 extending around the threaded shaft 28 and at its inner end abuts the adjacent ball nut 30 and at its outer end abuts the inner plate 70. A resilient member 72, for example, of polyurethene material or the like, is disposed between inner plate 70 and outer plate 74 to provide a resilient stop means for arresting or defining the outward position of the ball nuts 30 with respect to each other. The resilient stop assembly formed by the inner and outer plates 70 and 74 with the resilient material 72 therebetween is secured to the outer end of shaft 28 by a rotatable self-locking nut 75. Thus, as the result of maladjustment, switch failure or the like, any undue outward axial movement of the ball nuts 30 with respect to each other is gradually arrested to prevent any undesirable high stress in any of the components. The position of the resilient stop means above described may be readily adjusted by means of a self-locking nut 75.

A predetermined axially spaced apart position of a pair of bead supporting and locking means 80 at the inner ends of the drum assemblies 5 and 6 is achieved by the provision of a single first carrier adjusting means 81 comprising: (a) continuous hex shaft 82, (b) threaded sleeves 85 and 86 journalled in ball nut adapters 31 and rotationally driven by insert 79 having mating hex bore with shaft 82, and (c) pins 83 having threaded engagement with sleeves 85 and 86 and extending radially outwardly through slots 33 of shaft 32 to engage first carriers 89.

Nuts shown at 97 and 94 are adjusted along threaded sleeves 85 and 86 to minimize in conjunction with collar ends 77 the end play between sleeves 85 and 86 and ball nut adapters 31. Once adjusted, nuts 97 and 94 are locked by pins 84. Shaft 82 is journalled in member 205 and retained by hex headed member 76 which is pinned as at 76'.

As previously noted ball nut adapters 31 are assembled equidistant from the centerline 25. In assembling the adjusting means 81, hex shaft 82 is inserted initially only through sleeve 85 and turned until end assembly 6 is the same distance from the centerline 25 as end assembly 5. The shaft 82 is then advanced through sleeve 86 and any further rotation of shaft 82 will cause equal movement of both sleeves 85 and 86 and therefore of pins 83 with respect to ball nut adapters 31 and the centerline of the drum as well.

As shown in FIGS. 1a and 1b, the pins 83 are mounted with the outer ends extending radially within and in engagement with bores therefor in flange means 88 of the first carrier sleeve means 89 mounted for relative axial sliding movement on quill sleeve means 90 having inner flanges 92 which are made fast to the outer ends of pusher rings 20 by bolts 93. Thus the first carrier sleeve means 89 are mounted for adjustable relative axial sliding movement on quill sleeve means 90 to fixed adjusted positions equidistant to the transverse centerline of the intermediate drum 4 by reason of the quill 90 being slotted as at 91 to provide for the aforementioned predetermined axial position of pins 83 in both end drum assemblies.

As the ball nuts 30, pusher rings 20 and quill sleeve means 90 are axially driven toward and away from the vertical centerline 25 of the drum to operate the expansion and contraction of the intermediate drum assembly 4, the quill means 90 carry along with them the first carrier sleeve means 89. However, as noted by the use of right and left hand screws 85 and 86 the first carrier sleeve means 89 may be adjusted on the quill sleeve means 90. Thus it will readily be appreciated that by adjusting the first carrier sleeve means 89 axially outwardly on quill sleeve means 90, the effect will be to increase the bead set dimension of the bead supporting and locking means 80 for the drum.

Figure 6:
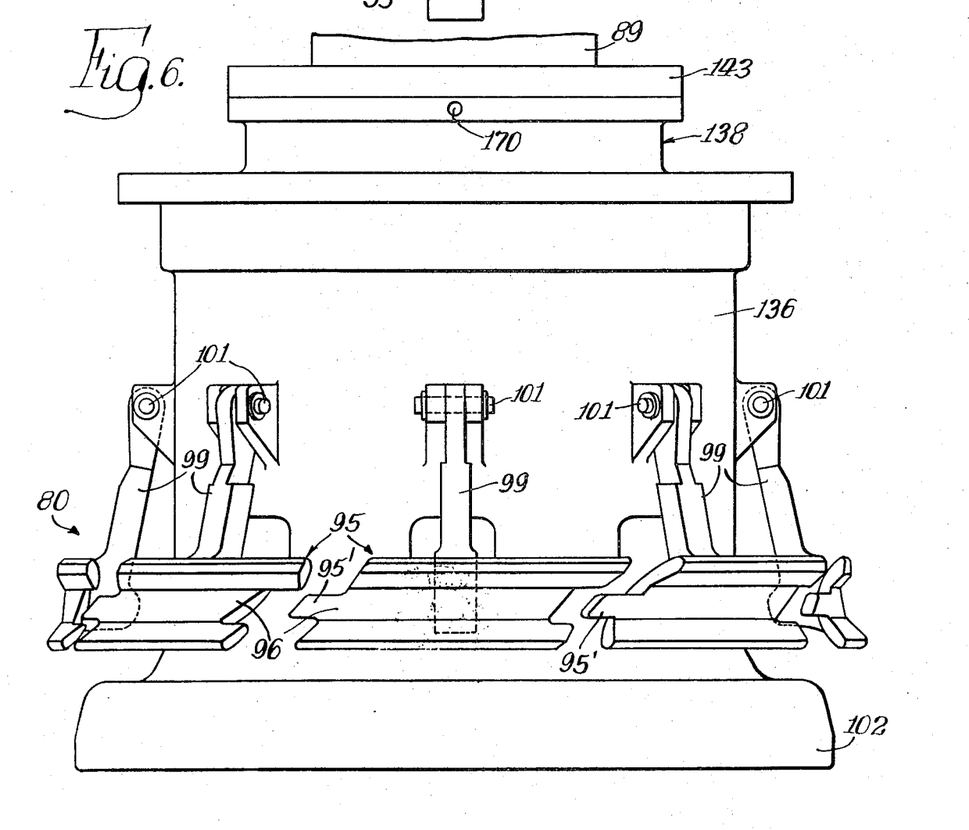
FIG. 6 is a plan view of the central portion of FIG. 5.

The bead supporting and locking means 80 comprise a plurality of circumferentially arranged clamping members 95 having outer concave or other suitable surfaces 96. The outer ends of bead supporting and locking means 80 are constructed with interlocking protrusions, best shown in FIG. 6 at 95', which allow the bead supporting and locking means to expand radially to clamp the materials to the inside surface of the beads and still not form gaps. Thereby each radial cord of the tire material is locked to the bead. The clamping members 95 are formed at the inner ends of links 99, pivotally connected at their outer ends as at 101, to brackets carried by annular sleeves 136 which, at their inner ends are formed with axially inwardly extending flanges 102 for supporting the elastic sleeve 36 axially inwardly of the tire bead supporting and locking means 80. The annular members 136, as shown in FIG. 1b are mounted for axial movement with annular members 137. Links 105, again as seen in FIG. 1b are at their axial outer ends, pivotally mounted, as at 107 to the inner end of cylinder 150, hereinafter referred to and, at their axial inner ends connected, as at 106, to links 99 carrying clamping members 95.

Upon continued reference to FIG. 1b it will be seen that first and second carrier means 89 and 138 respectively, define first cylinder means 140 therebetween in which piston 142 and end cap 143 are disposed and retained in position in any suitable manner. The second cylinder means 150 is formed between portions of piston means 103 and second carrier means 138 within which double acting piston 152 is disposed. End cap 153 is disposed at the inner end of cylinder 150 and is suitably retained in fixed position. First coil means is disposed between piston 142 of the first cylinder means and seat 162 and member 138 and serves when the drum is collapsed to hold the inner ends of the second carrier sleeve means 138 in engagement with the outer surface of flange means 88 of first carrier sleeve means 89.

It will be understood that the foregoing apparatus is provided with conventional bead placer and pusher ring means which will be shown and described in the following description concerning the operation of the above described apparatus.

The annular sleeve 136, again as seen in FIG. 1b, is secured to radially outwardly extending flanges 137 of second carrier sleeve means 138. Suitable seals are provided for the aforedescribed first and second cylinder means to prevent escape or leakage of fluid therefrom. It will be noted that with respect to first cylinder means 140 there is provided a fluid pressure connection diagrammatically illustrated at 170 in FIGS. 1a and 1b between piston 142 and cap 143. A first fluid pressure inlet and outlet, also diagrammatically shown, is provided at 173 at the outer ends of double acting piston means 152 in the second cylinder means 150 and a second fluid pressure inlet and outet, diagrammatically shown at 164, at the inner ends of double acting piston means 152. Sleeve 36, as previously mentioned, if desired may have embedded therein steel wire or other material of high tensile strength to prevent elongation of the sleeve in the successive formation of tire carcass material supported on the sleeve into desired configuration.

It will be seen that sleeve 36 is secured in position by threaded studs 180 which, at their inner ends, are secured to end ring means 181 in which enlarged annular end portions 182 of the sleeve 36 are mounted. Studs are threaded in engagement with the threaded adjusting sleeves 183 for adjusting the axially spaced apart positions of the ring members 181 for purposes of tensioning the sleeve 36.

As before mentioned, each end drum assembly provides for the support of an inflatable ply turn-up bag means 185. Each ply turn-up bag means is of envelope configuration and comprises inner and outer layers of rubber as shown in FIG. 1b at 186 and 187 respectively, which, if desired, may also be axially reinforced by steel wires or other material of high tensile strength. Inwardly of each of the inner ends of the inflatable ply turn-up bag means 185, the inner layers 186 of the ply turn-up bag means is formed, again as best seen in FIG. 1b, with a truncated portion 189 having a snug fit with a correspondingly formed groove in an annular end drum frame member 192 which encases the aforedescribed anchoring means for the elastic sleeve 36 and the various components previously described in each of the end drum assemblies. The truncated portions 189 are ported, as shown in FIG. 1b, at 194, for admitting fluid under pressure into the inflatable ply turn-up bag means 185 to effect inflation of the same and also for releasing fluid under pressure for deflation of the inflatable ply turn-up bag means 185. Also it will be seen that the innermost ends of the inflatable ply turn-up bag means are tapered and adapted to lie between the portions of the elastic sleeve 36 inwardly of the end drum assemblies 5 and 6 and between the tire carcass material 7 at the positions at which tire beads are adapted to be located prior to forming the tire carcass material into the desired configuration. Suitable seals are provided throughout the end drum assemblies so as to provide a closed interior chamber for the apparatus at which fluid under pressure is adapted to be admitted and released through a fluid port diagrammatically shown at 202 at the outer end of drive shaft means 57. It will be seen that the outboard end of the drum assembly 6 is provided with the aforementioned closed end wall 205 for closing or sealing off the opposite end of the quill shaft 32.

OPERATION OF THE AFOREDESCRIBED APPARATUS

Figure 10:
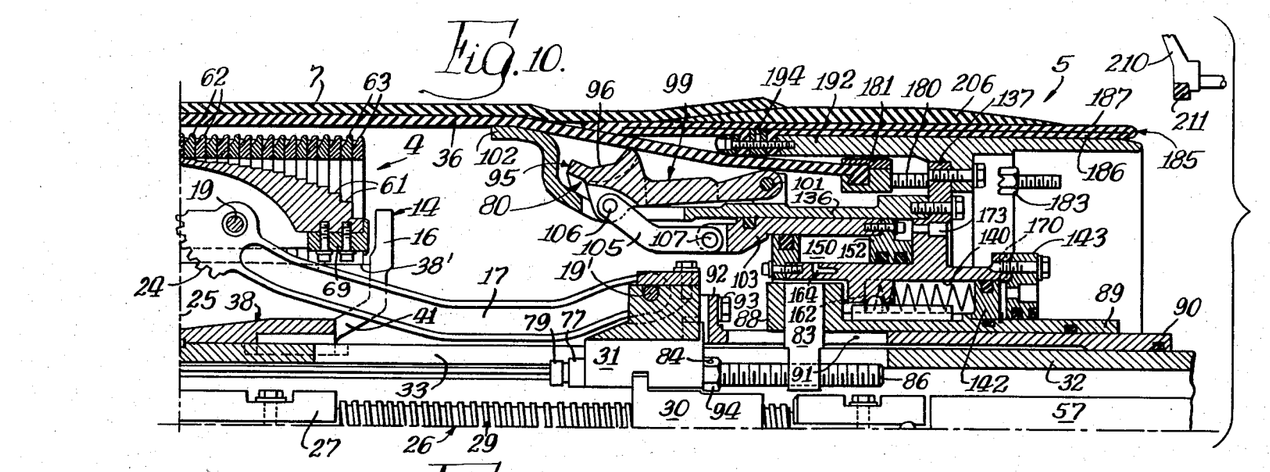
FIGS. 10 through 16 show the upper right hand quadrant of the apparatus shown in FIG. 1b, illustrating the sequence of positions of the intermediate drum assembly and the right drum assembly in fabricating a tire.

Referring now to FIGS. 1a, 1b and 10, the several parts are in their initial starting positions in which the tire bead supporting and locking means 80 have been adjusted, as before described, to a desired position equidistant of the vertical median axis 25 of the intermediate drum assembly 4. The bead supporting and locking means 80 are disposed in their radial inoperative positions. Thus in this position of the parts the tire carcass material 7 is applied over the intermediate drum assembly and over sidewall components 206 disposed about the outer surfaces of the inflatable ply turn-up bag means 185 with the inner peripheral edges of the sidewalls 206 being disposed inwardly of the outer end portions of the tire carcass material, and with the inner tapered portions of the inflatable ply turn-up bag means 185 being disposed under the tire carcass material to lie radially outwardly of the tire bead supporting and locking means 80. Other components desired for the tire carcass material may also be assembled with the parts of the apparatus of the position shown in FIGS. 1a, 1b and 10.

Figure 11:
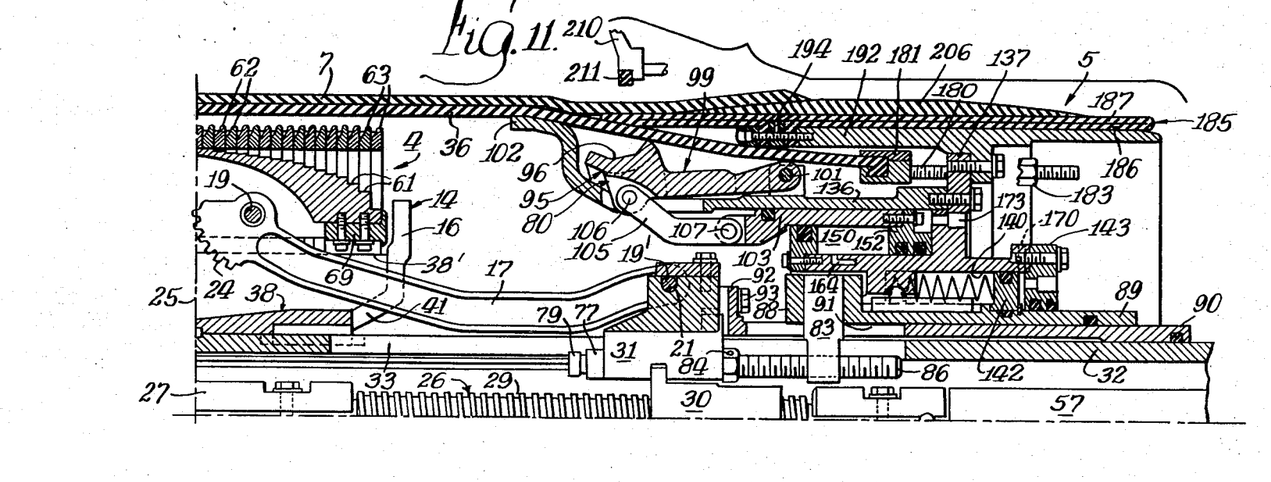

Turning now to FIG. 11, a conventional tire bead placing and pusher ring means 210 having a tire bead 211 mounted therein is moved from a position axially outwardly of the end drum assembly to the position shown in FIG. 11 for supporting the tire bead radially outwardly of the tire bead supporting and locking means 80. It is to be understood that the foregoing is also true of the end drum assembly 6 and the following description, while limited to the drum assembly 5, is also true of the drum assembly 6.

Figure 12:
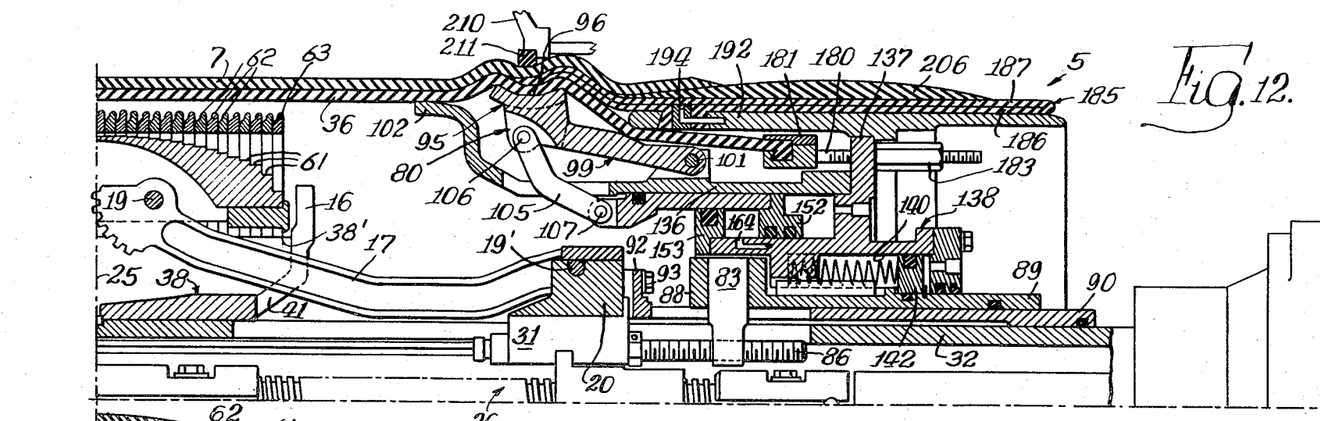

With the tire beads 211 thus supported, the tire bead supporting and locking means 80 is actuated by admitting fluid under pressure through port 173 into the second cylinder means 150 which, through the components previously described, effects outward pivotal movement of the member 99 to engage the concave inner surface 96 with the elastic drum sleeve thereat clamping the carcass material at the inner end of the ply turn-up bag means 185 with the tire beads 211 supported by the tire bead placing and bag turn-up means 210. Thus in the position of FIG. 12 the tire beads are caused to be locked from inside the drum and appropriately spaced apart in axial relationship, and after which tire bead placing and bag turn-up means 210 is withdrawn to retracted position and radial expansion of the intermediate drum assembly is initiated as before described. The tire beads at this time are locked with the tire carcass material substantially flat so that during the shaping operation the tire bead to tire bead periphery stays constant.

Figure 13:
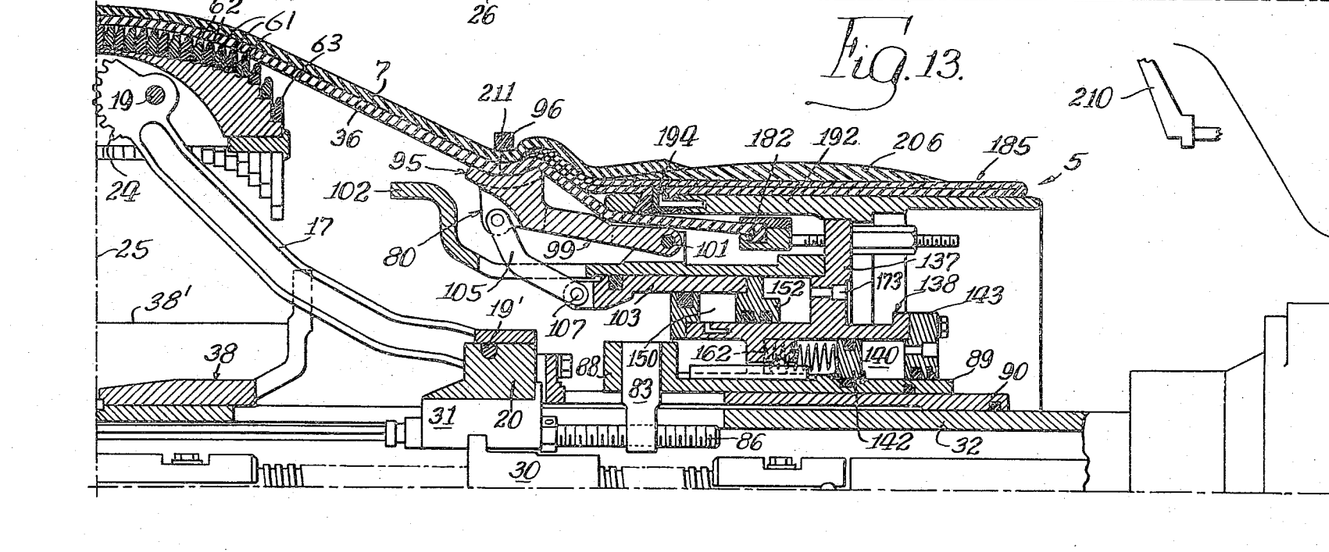

As shown in FIG. 13 pressure is maintained in cylinder 150 through port 173 to continue to lock the tire cords in the tire carcass material to the tire beads to maintain the periphery of the tire true. Further, air is introduced in the cylinder 140 to keep the materials taut as the tire carcass material is expanded.

The expansion of the intermediate drum assembly 4 is continued with pressure maintained, as aforenoted, in both cylinders 140 and 150 until the tire carcass material is formed by the supporting members 62 and 63 with the center portion of the tire carcass material conforming to that of the crown portion of the tire carcass of a cured tire.

Figure 14:
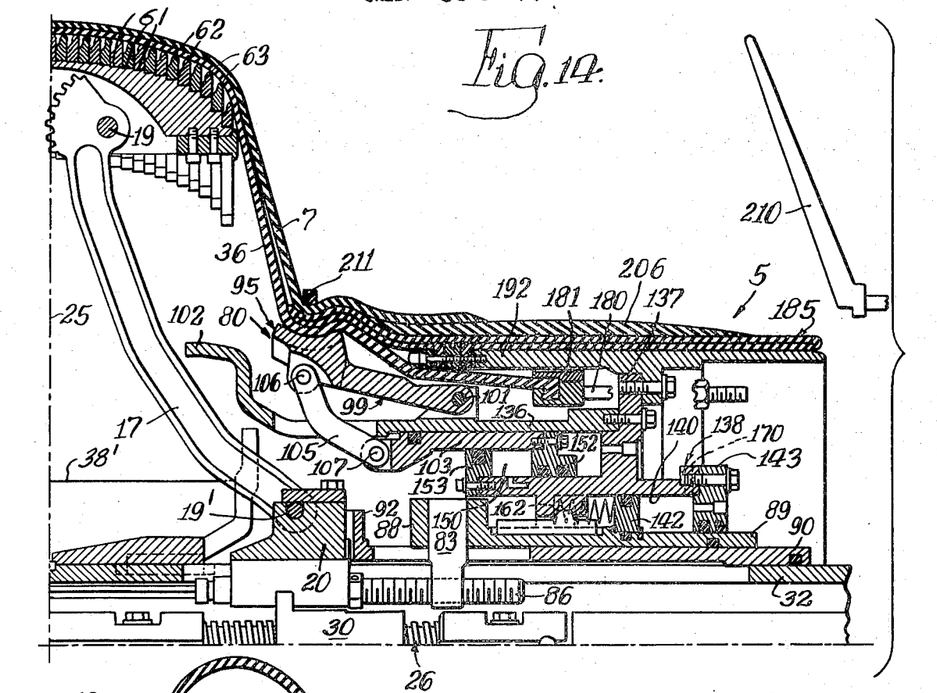
Figure 15:
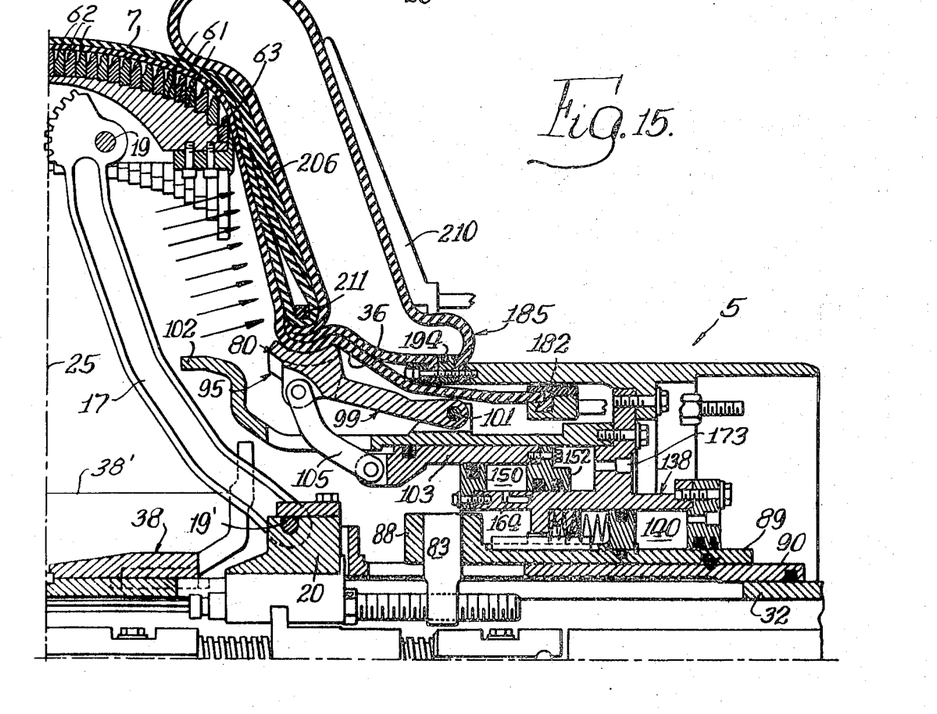

As seen in FIG. 14, after completion of the formation of the tire carcass material into the configuration aforedescribed with pressure maintained in the second cylinder means 150 and port 170 under pressure, fluid under pressure is admitted to port 194 to inflate ply turn-up bag means 185, as shown in FIG. 15, and in which the tire bead placing and bag turn-up means 210 is advanced to engage the bag to effect turning up of the outer end portions of the tire carcass material to encase tire beads 211 and apply the sidewall components to the side of the tire carcass. Since the ply turn-up bag means are axially reinforced and the sidewall material is placed on the bags in flat condition, the sidewalls are accurately placed for ply turn-up and sidewall placement.

Figure 16:
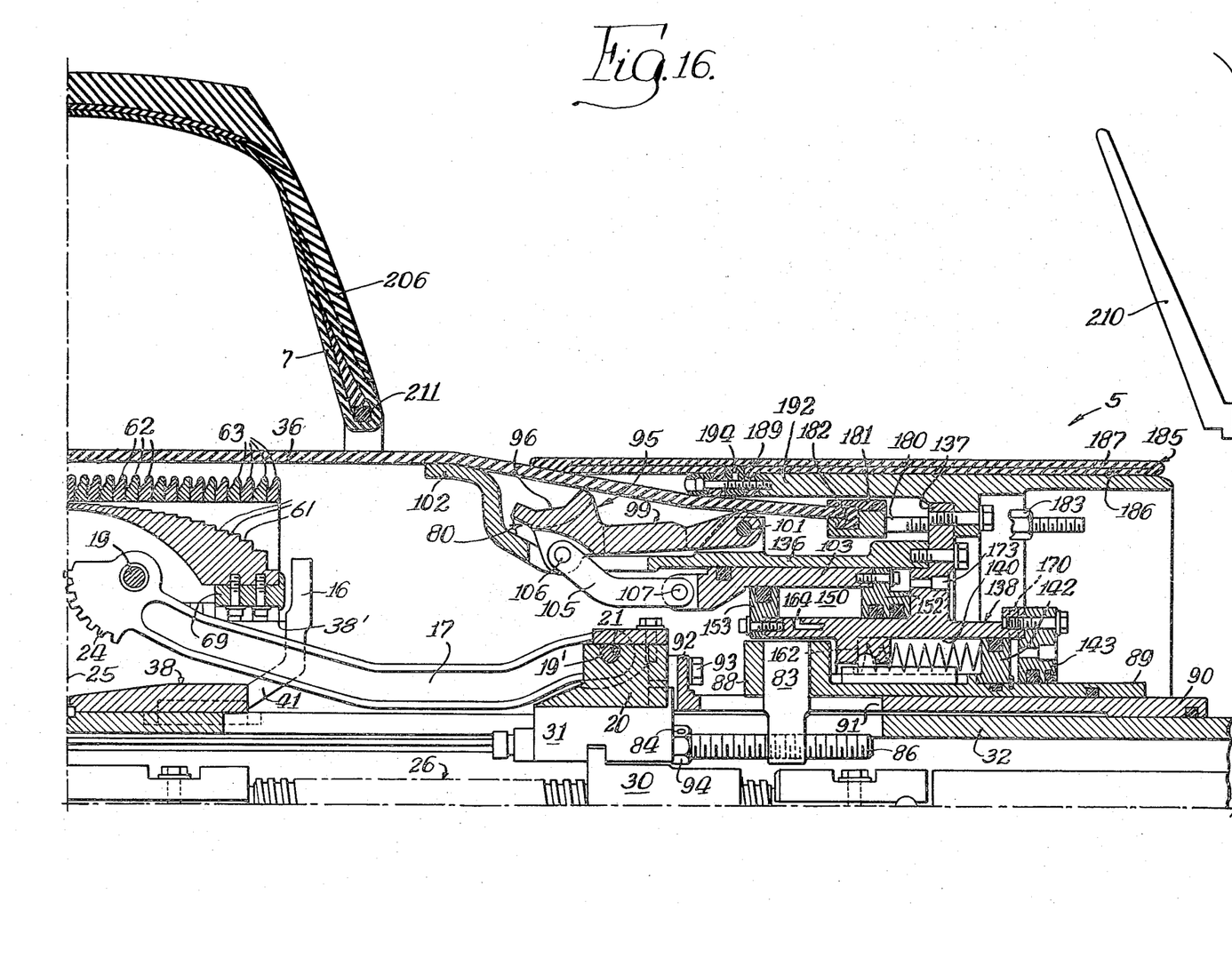

After application to the sidewall components and as shown in FIG. 16, the tire bead placing and ply turn-up bag means 210 is retracted to its inoperative position and, as shown in the last noted figure, breaker and tread components may be applied to the crown of the tire carcass material which, in the particular arrangement shown, provides a tread over sidewall construction. It will be understood, however, that if desired the breaker and tread strips may be applied before application of the sidewalls and the sidewalls thereafter applied so as to provide a sidewall over tread tire construction. It will be seen that the true radial concentricity of the breaker and tread is maintained since all of the tire components are mechanically held at this point.

While encasing the tire beads in the application of the sidewall components, the interior of the drum apparatus is placed under pressure, as by admitting fluid under pressure through the aforedescribed port 202 at the outer end of drive shaft 57 to provide a reaction force for the final stitching by the tire bead placing and ply turn-up means 210, and applying or stitching the sidewall components to the shaped tire carcass. After application of the sidewall components, the ply turn-up bag means 185 is deflated and the pusher ring means 210 returned to the position shown in FIG. 10.

After completion of the construction of the tire carcass as above described, fluid under pressure is bled from first cylinder means 140 through port 170 and fluid under pressure is admitted through port 164 with port 173 under bleed to initiate return of the several parts to position shown in FIGS. 1a, 1b and 10 to enable removal of the formed tire carcass by axially moving the same outwardly over the end drum assembly. Thereafter, of course, the tire may be cured in a conventional curing mold to form a completed tire.

In the foregoing operation tire beads are unable to rotate so that each wire of tire beads carries an equal load and provides a highly uniform tire.

MODIFICATION OF INTERMEDIATE DRUM ASSEMBLY OF FIRST DESCRIBED EMBODIMENT

Figure 17:
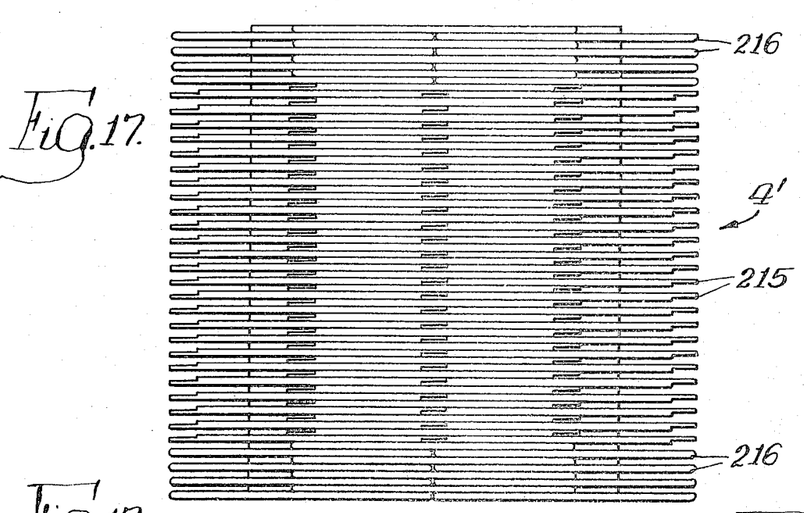
FIG. 17 is a plan view of a modified supporting member construction according to the present invention with the supporting member being shown in a collapsed position of the drum.
Figures 17A, 18, 18A:
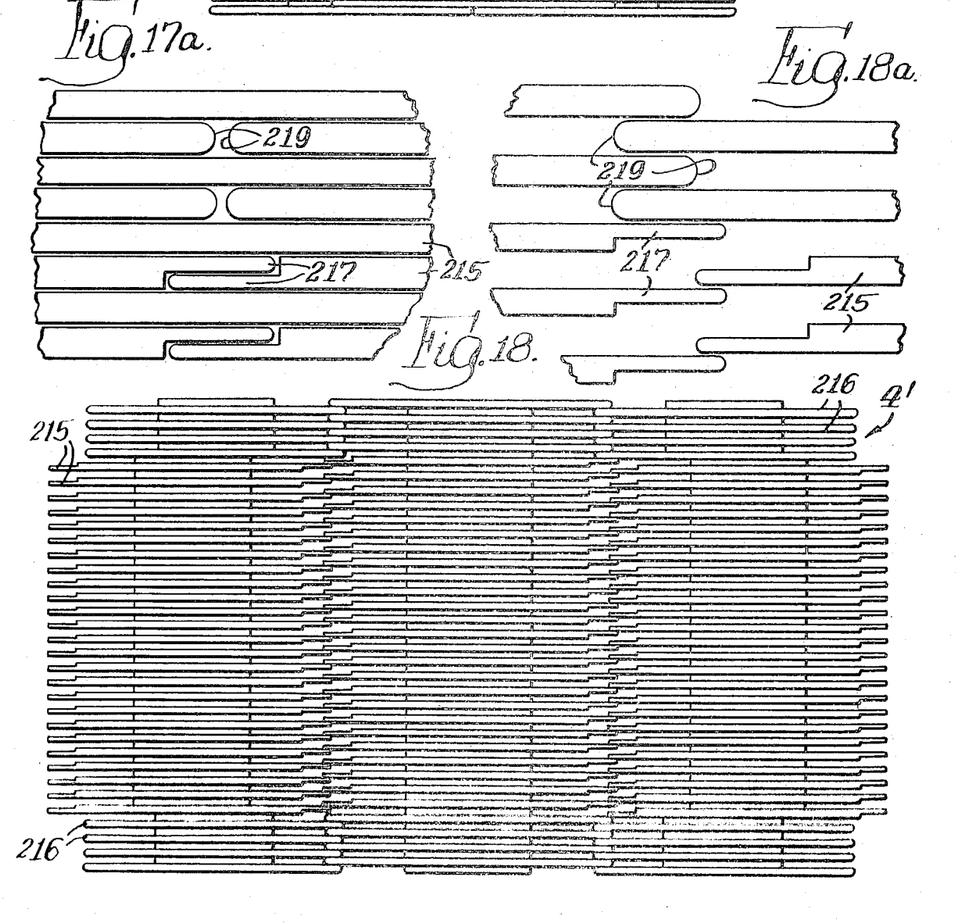
FIG. 17a is a detailed enlarged view of a portion of FIG. 17.
FIG. 18 is a view similar to FIG. 17 but showing the supporting members in the expanded position of the intermediate drum assembly.
FIG. 18a is a detailed enlarged view of a portion of FIG. 18.

Referring now to FIGS. 17 and 17a and 18 and 18a there is shown a modified form of intermediate drum assembly 4' embodying interleaved intermediate supporting members 215 and end drum supporting members 216. As best seen in the enlarged detail views 17a and 18a, the intermediate supporting members 215 are formed with outer end portions of reduced cross-section of interfitting step formation as shown at 217. The outer supporting members 216, as before, are of uniform cross-section throughout their length providing flat abutting side surfaces and at their outer ends are rounded as at 219. The supporting members in FIGS. 17 and 17a are shown in the collapsed position of the drum in which it will be noted that the outer end portions 217 of the intermediate supporting members 215 are in interleaved relation with outer end portions 217 of once circumferentially removed intermediate supporting members 215. In the expanded position of the drum as shown in FIGS. 18 and 18a the outer end portions 217 of intermediate supporting members 215 remain in interleaved relation with end portions 217 of once circumferentially removed intermediate supporting members 215 so as to avoid the presence of gaps in the outer peripheral surface of the drum when in expanded position. The supporting members in the position shown in FIGS. 18 and 18a may provide, if desired, a circumferentially supporting surface conforming to that of the carcass of a cured tire.

The foregoing drum assembly 4' may be embodied in the apparatus as first described in the manner abovedescribed. It is believed the manner in which the supporting members function in relation to each other will be readily obvious.

DESCRIPTION OF A SECOND EMBODIMENT OF THE INVENTION

Referring now to FIGS. 19 and 20 the intermediate drum assembly 4" comprises a plurality of solid deck segments 8' formed with a plurality of integral intermediate supporting members 220 and end supporting members 222. The peripheral surfaces of the several supporting members 220 and 222 lie in the arc of the desired crown portion for the formation of the crown of the tire carcass material of desired configuration and conforming to that, if desired, of the crown portion of a carcass of a cured tire.

As best seen in FIG. 20 the intermediate supporting members 220 have tapered outer portions rounded at their ends as described in connection with the first embodiment of the invention, and flat end supporting members 222 also as first described in accordance with the first embodiment of the invention.

A plurality of the deck segments 8' are arranged in circumferentially adjacent relationship with the supporting members of each of the deck segments 8' in interleaved relation.

The drum assembly 4" may be incorporated in the apparatus first described with all the components of the apparatus being as already described. It is believed obvious that the manner of operation of a drum with the integral drum segments 8' will be readily understood without further description thereof. It should be particularly noted that the interleaved outer end portions of reduced area provide supporting members of previously known constructions. Also it will be apparent that the outer end portions of the intermediate supporting members 220 may be of the stepped overlapping configuration of FIGS. 17, 17a, 18 and 18a.

While there have been shown various modifications and arrangements of the invention it will be understood that modifications and rearrangements may be made therein without departing from the spirit and scope of the invention.

The invention claimed is:

1. In a tire building apparatus having an expandable drum defined by a plurality of circumferentially arranged deck segments each comprising a plurality of peripherally extending supporting members with the supporting members of adjacent deck segments being adapted to be disposed in interleaved relation for movement radially and circumferentially relative to each other, drum expanding and contracting means for expanding and contracting said expandable drum with said supporting members defining supporting surfaces of different radii, said supporting members having interleaved outer end portions of less cross-sectional area than the cross-sectional area of the intermediate body portions thereof to provide in the contracted position of said expandable drum for overlapping of outer end portions of once circumferentially removed supporting members and provide in the expanded position of said expandable drum a circumferentially extending supporting surface of a continuous length.

2. In a tire building apparatus an expandable drum comprising a plurality of circumferentially arranged deck members, guide block means for guiding said deck members, a plurality of individual supporting members disposed in side-by-side relation and associated with each of said deck members, drum expanding and contracting means for expanding and contracting said expandable drum, said individual supporting members associated with adjacent deck members being interleaved for radial and circumferential movement with respect to each other upon expansion and contraction of said expandable drum, and said individual supporting members being aligned in first predetermined positions by a first pair of positioning surfaces, and being aligned in second predetermined positions by a second pair of positioning surfaces.

3. The tire building apparatus of claim 2 characterized by said supporting members having interleaved outer ends of less cross-sectional area than the cross-sectional area of the intermediate body portions thereof to provide in the expanded position of said intermediate drum a circumferentially extending supporting surface of a length equal to the circumferential length of said interleaved outer end portions and the circumferential lengths of said supporting members between said outer end portions.

4. The tire building apparatus of claim 1 in which the outer ends of said outer end portions of the supporting members are tapered with the tapers of adjacent interleaved supporting members being in sliding engaging relation.

5. The tire building apparatus of claim 1 in which the outer ends of the outer end portions of the supporting members are of interfitting stepped formation.

6. The tire building apparatus of claim 1 in which the outer end portions of the supporting members are tapered with the tapers of adjacent interleaved supporting members being in sliding engaging relation.

7. The tire building apparatus of claim 1 in which the outer end portions of the supporting members are of interfitting stepped formation.

8. The tire building apparatus of claim 2 in which said second positioning surfaces of said supporting members engage surfaces of said deck members of radially inward stepped formation in a direction axially outwardly from the center of the deck members toward the outer ends of the deck members.

9. The tire building apparatus of claim 2 in which the outer end supporting members have flat abutting surfaces slidingly engaging with each other to prevent axial dislocation of the drum in the expansion thereof.

10. The tire building apparatus of claim 1 characterized by the provision of an end drum assembly at opposite ends of the expandable drum which, together with the expandable drum, provide a supporting surface for elongated hollow tire carcass material, whereby upon expansion of the expandable drum the tire carcass material is displaced at the center portion thereof to form the same into the true shape of the crown portion of the carcass of a cured tire, means for holding tire beads in positions inwardly of the outer ends of said tire carcass material for maintaining the tire carcass material between said beads under tension during expansion of said expandable drum, and means for encasing said tire beads in the outer end portions of the tire carcass material.

11. The tire building apparatus of claim 2 characterized by the provision of an end drum assembly at opposite ends of the expandable drum which, together with the expandable drum, provide a supporting surface for elongated hollow tire carcass material, whereby upon expansion of the expandable drum the tire carcass material is displaced at the center portion thereof to form the same into the true shape of the crown portion of the carcass of a cured tire, means for holding tire beads in positions inwardly of the outer ends of said tire carcass material for maintaining the tire carcass material between said beads under tension during expansion of said expandable drum, and means for encasing said tire beads in the outer end portions of the tire carcass material.

* * * * *